No. 806,374. PATENTED DEC. 5, 1905.
G. N. SPENCER.
WAGON.
APPLICATION FILED MAY 3, 1905.

3 SHEETS—SHEET 1.

WITNESSES:
G. E. Walker.
J. E. Hawkins

INVENTOR:
George N. Spencer,
By Lucius C. West.
Atty

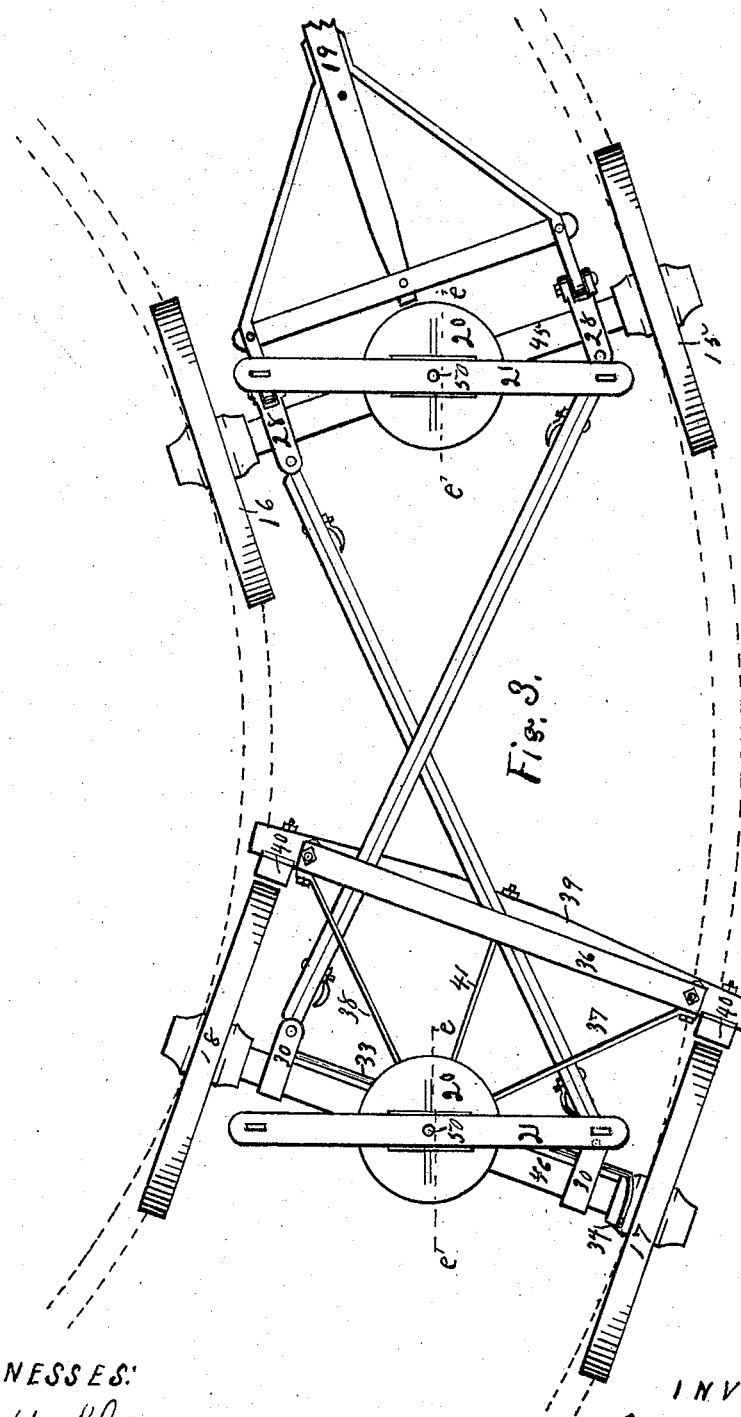

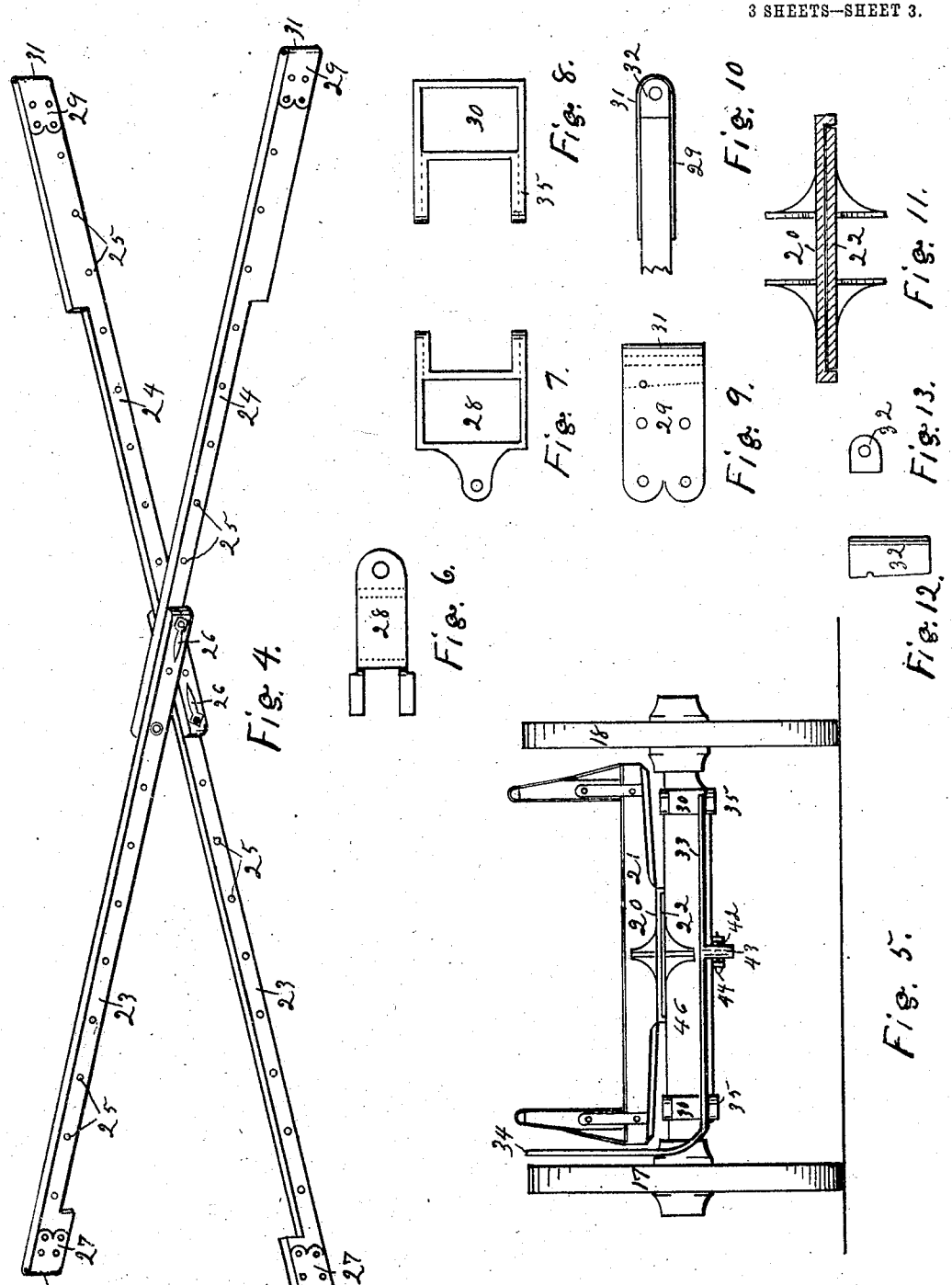

UNITED STATES PATENT OFFICE.

GEORGE NELSON SPENCER, OF HILLSBORO, OREGON.

WAGON.

No. 806,374. Specification of Letters Patent. Patented Dec. 5, 1905.

Application filed May 3, 1905. Serial No. 258,657.

*To all whom it may concern:*

Be it known that I, GEORGE NELSON SPENCER, a citizen of the United States, and a resident of Hillsboro, in the county of Washington, State of Oregon, have invented new and useful Improvements in Wagons, of which the following is a specification.

This invention relates to four-wheeled vehicles, in the construction of which are employed crossed coupling-bars in lieu of the ordinary reach; and the object of the invention is to produce the within-described and claimed improvements designed to lighten, cheapen, and make more durable the construction and to facilitate the use and operation especially when hauling long loads of logs or lumber, &c., among stumpy and rocky roads and places.

Figure 1:
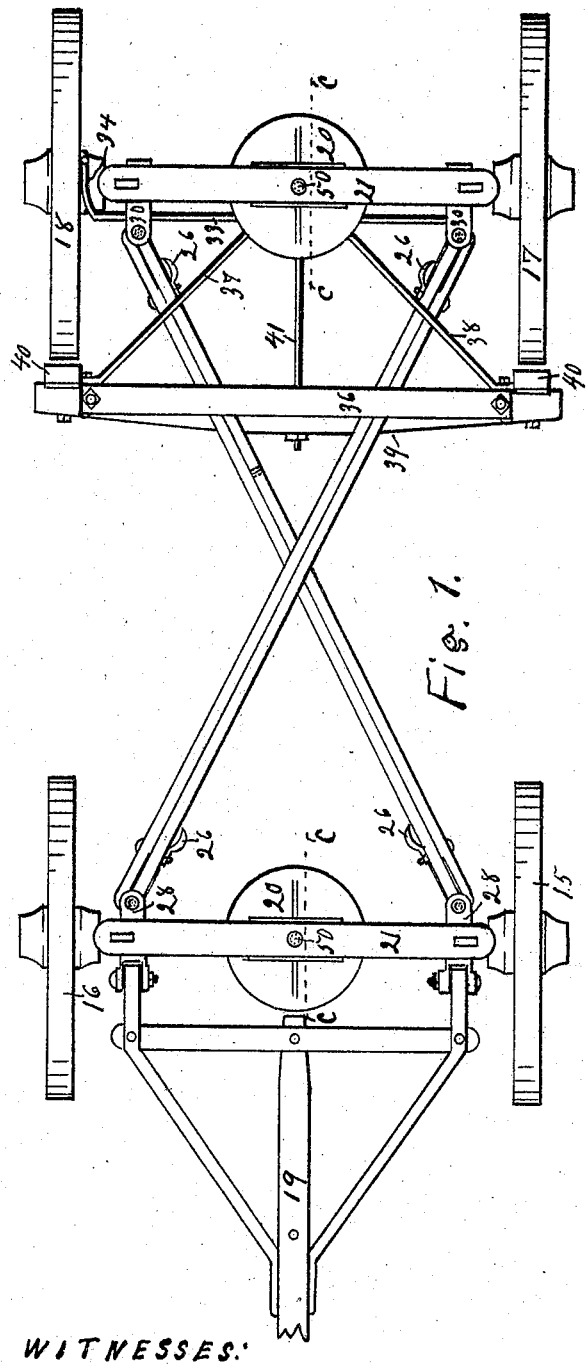
Figure 2:
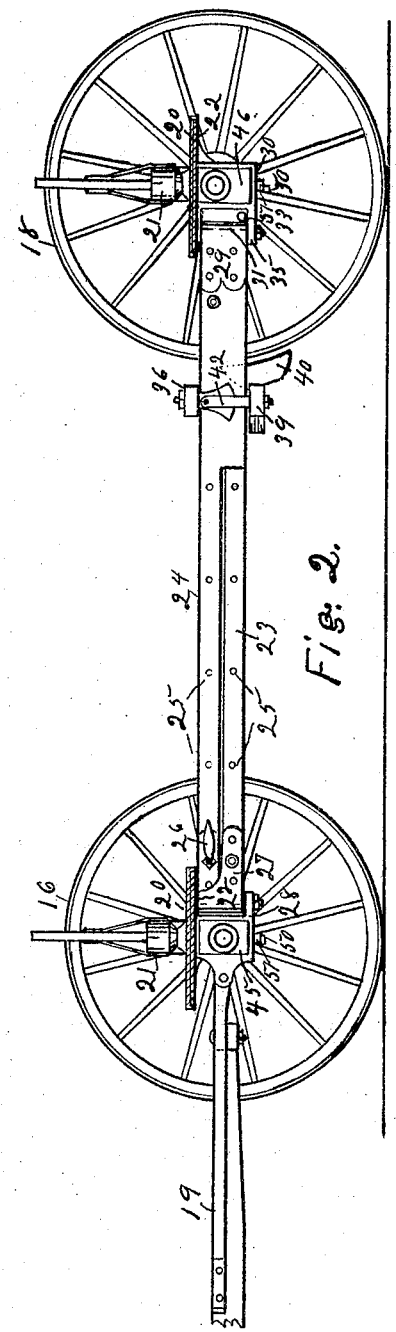

In the accompanying drawings, forming a part of this specification, Figure 1 is a plan of the wagon in the position as when being driven straight ahead; Fig. 2, a side elevation of parts in Fig. 1, said parts being in section near dotted lines $c\ c$ in Fig. 1; Fig. 3, a plan of the wagon as when turning, the curved dotted lines indicating the track of the wheels; Fig. 4, a top perspective view of the crossed coupling-bars; Fig. 5, an elevation of the rear axle and connections looking from a point forward of said axle, the crossed coupling-bars being removed and showing the brake-lever; Fig. 6, a plan of a forward axle-clip; Fig. 7, a side elevation of same; Fig. 8, a side elevation of a rear axle-clip; Fig. 9, a side elevation of the hinge-strap on the ends of the crossed coupling-bars enlarged; Fig. 10, a plan of the same; Fig. 11, a sectional elevation of the circle-plates near the dotted line $c\ c$ in Fig. 1 and the dotted line $e\ e$ in Fig. 3; Fig. 12, a side elevation of the box used in the end of the hinge-straps, and Fig. 13 is a plan of the same.

Referring to the parts of the drawings pointed out by numerals, 15 and 16 are the forward wheels on the forward axle 45, and 17 and 18 are the rear wheels on the rear axle of the wagon, Figs. 1, 2, 3, and 5. The wagon-tongue is shown broken away at 19 in Figs. 1, 2, and 3.

Important features of the vehicle are the large circle-plates of the front and rear bolsters and axles and mode of attaching bolsters, thus insuring strength and durability in heavy hauling. The large circle-plates 22 are attached centrally to the axles 45 46. Large circle-plates 20, having down-flanging rim around the circle-plates 22 to keep out dust, are centrally attached to the front and rear bolsters, so as to fit on and over the circle-plates 22 when the bolsters 22 are attached to the axles 45 and 46 by the king-bolts 50. These king-bolts 50 extend down through the axles 45 and 46 and are provided on the lower end with nuts 51, as shown in Fig. 2, by means of which nuts 51 when properly set the circle-plates are kept in proper registering adjustment and the bolsters are prevented from tilting unduly on rough and uneven roads, and loads are kept at more nearly a balance in heavy hauling.

The crossed coupling-bars are made each of two parts, the forward parts 23 and the rear parts 24, and these parts are provided with registering holes 25, so that they may be lapped together and bolted at a desired adjustment for length of load by bolts having tail-nuts 26, Figs. 1 and 4.

When the crossed coupling-bars are lapped their full length, as for almost any ordinary use of the wagon, as in Figs. 1, 2, and 3, the wagon is adjusted to about the normal length, and said wagon can be adjusted at different desired lengths by means of these divided crossed coupling-bars, even to the extent of their greatest length, as in Fig. 4. Under these different adjustments they operate with equal utility.

The forward parts 23 are provided at the forward ends with vertically-widened hinge-straps 27, which are pivotally attached to the forward axle-clips 28, and the rear ends of the rear parts 24 are provided with like hinge-straps 29, which are pivotally attached in like manner to the rear axle-clips 30. The ends of the parts 23 and 24 which bear the hinge-straps are vertically widened, as particularly shown in Fig. 4. The object of these vertically-widened ends is to prevent the axles from a tendency to roll, which they cannot do when thus braced by these widened parts set edgewise, as shown. The loop end 31 of the hinge-straps 27 and 29, which are formed by lapping or folding the metal of which the straps are composed over onto itself, are provided with pivotal bearing-boxes 32, which when unduly worn can be readily and cheaply replaced without the expense of either new crossed coupling-bars or hinge-straps.

The widened portion of the rear parts 24 of the crossed coupling-bars are longer than the widened portion at the front end to loosely fill the space between the brake-bar 36 and the brake-beam 39, in which space the crossing coupling-bars are permitted to swing or slide laterally without interruption and still occupy the desirable and proper position when the wagon turns. The rotatable brake-lever 33 rests on the lower ear 35 of each rear axle-clip 30, Figs. 2 and 5, in a manner to rotate on said ears when the brake-handle 34 is swung to operate the brake, Figs. 1, 2, and 3. To the ends of the brake-bar 36 are pivoted the upper ends of links 42, the lower ends of said links being attached to the ends of the brake-beam 39, which admits of the brake-blocks 40 being brought against the wheels 17 and 18. The brake-bar 36 is held in a rigid manner attached to the rear axle 46 by brace-rods 37 38 at a suitable distance forward of said axle, and the brake is kept in a straight and proper position in its relation to the wheels when the wagon turns. A connecting-rod 41 is attached at the ends to the brake-beam and brake-lever, the rear end of said rod 41 being forked at 42, a downward projection 43 of the brake-lever 33 being loosely inserted between the tines of the fork and pivoted therein by pivot 44, Fig. 5.

By swinging the handle 34 the brake-blocks 40 are brought in contact with the wheels 17 and 18 whether the wagon is going straight or on a turn, and the brake is always in working order whatever the position of the wagon.

With the described use of the crossed coupling-bars, whether the axles are the greatest or shortest distance apart, the rear wheels 17 and 18 always follow the tracks of the forward wheels 15 and 16, whether the wagon is going straight ahead or turning, for which reason heavy loads are easily drawn and a wagon can turn on a smaller space.

Users of wagons or other four-wheeled vehicles having my improvements attached will discover many advantages on their account which I need not here enumerate, and for that matter even on smooth roads.

Having thus described my invention, what I claim as new, and desire to secure by Letters Patent of the United States of America, is—

The crossed coupling-bars provided with widened pivot-straps at the ends, and front and rear wheeled axles provided with the eared clips to which the pivot-straps are pivoted, combined with the brake-bar above said coupling-bar and rigidly attached to the rear axle, the brake-beam below the coupling-bars, links attached to the ends of the brake-beam and pivotally attached to the ends of the brake-bar, the handled lever rotatable on the ears of the rear axle-clips, and a rod connecting the brake-beam and brake-lever, one end of said rod being forked and pivotedly attached to a downward projection of the brake-lever, substantially as set forth.

GEORGE NELSON SPENCER.

Witnesses:
L. E. SHUTE,
E. B. TONGUE.